(12) United States Patent
Ramsden et al.

(10) Patent No.: US 7,547,887 B2
(45) Date of Patent: Jun. 16, 2009

(54) GAMMA RAY SPECTROMETERS

(75) Inventors: David Ramsden, Southampton (GB); Matthew Dallimore, Dibden (GB)

(73) Assignee: Symetrica Limited, Southampton (GB)

( * ) Notice: Subject to any disclaimer, the term of this patent is extended or adjusted under 35 U.S.C. 154(b) by 170 days.

(21) Appl. No.: 11/597,535

(22) PCT Filed: May 13, 2005

(86) PCT No.: PCT/GB2005/001830

§ 371 (c)(1),
(2), (4) Date: Jun. 20, 2007

(87) PCT Pub. No.: WO2005/116691

PCT Pub. Date: Dec. 8, 2005

(65) Prior Publication Data

US 2008/0067390 A1    Mar. 20, 2008

(30) Foreign Application Priority Data

May 24, 2004   (GB) ................................ 0411555.6

(51) Int. Cl.
*G01T 1/203* (2006.01)
(52) U.S. Cl. .................... 250/361 R; 250/362
(58) Field of Classification Search ............ 250/361 R, 250/362
See application file for complete search history.

(56) References Cited

U.S. PATENT DOCUMENTS 3,786,253 A * 1/1974 Haffner et al. ........... 250/360.1
4,234,792 A * 11/1980 DeCou et al. .......... 250/370.09
4,345,153 A * 8/1982 Yin ............................ 250/369
4,509,042 A   4/1985 Kruse
5,218,202 A   6/1993 Evers et al.
5,821,541 A * 10/1998 Tumer ................... 250/370.09
2003/0098418 A1   5/2003 Joubert

FOREIGN PATENT DOCUMENTS

EP          0490108      6/1992
WO          WO 02/31536  4/2002

OTHER PUBLICATIONS

Bukin D A et al., "Scintillation Counter with WLS Fiber Readout" Nuclear Instruments & Methods in Physics Research, Section—A: Accelerators, Spectrometers, Detectors and Associated Equipment, North Holland Publishing Company; vol. 384, No. 2, Jan. 1997, pp. 360-363, XP004016568, ISSN: 0168-9002.

(Continued)

*Primary Examiner*—David P Porta
*Assistant Examiner*—Mark R Gaworecki
(74) *Attorney, Agent, or Firm*—O'Melveny & Myers LLP

(57) ABSTRACT

A gamma ray detector (50) comprises a plastic scintillation body (52) arranged to receive incident gamma rays to be detected. Photons are generated in response to the gamma rays by excitation and de-excitation processes in the scintillation body. The photons are detected using at least one photodetector (56) which generates an output signal representative of the energy of the gamma rays. The scintillation body has a detection surface to receive the gamma rays and a thickness in a direction substantially orthogonal to the detection surface that is not greater than 5 cm. Deconvolution techniques can be used to improve the output signal; the thinness of the scintillation body allows sufficiently accurate results to be obtained that individual isotopes can be readily identified. The detector can be usefully employed in portal radiation monitors.

24 Claims, 6 Drawing Sheets

OTHER PUBLICATIONS

Meng, "An Inter-Comparison of Three Spectral-Deconvolution Algorithms for Gamma-ray Spectroscopy" Nuclear Science Symposium, IEEE Oct. 24, 1999, vol. 2, pp. 691-695, XP0105005571, ISBN: 0-7803-5696-9.

Hohara et al. "A Simple Method of Energy Calibration for Thin Plastic Scintillator" IEEE 2001; 0-7803-6503-8/01, pp. 6-226-6-230.

Miyajima et al. "Number of Scintillation Photons Emitted In NaI(TI) and Plastic Scintillators by Gamma-Rays" IEEE 1993; 0-7803-0883-2/93, pp. 132-134.

Naqvi et al. "Pulse Height Resolution of Organic Scintillators for Monoenergetic Gamma Rays" IEEE 1993; 0-7803-0883-2/93, pp. 4-6.

Meng, "An Inter-Comparison of Three Spectral-Deconvolution Algorithms for Gamma-ray Spectroscopy" IEEE Trans Nuclear Science, 47, vol. 4, pp. 1329-1336, Aug. 2000.

Berger et al. "Response Functions for Sodium Iodide Scintillation Detectors" Nuclear Instruments and Methods A104, pp. 317-332, 1972, North-Holland Publishing Co.

Ely et al., "Discrimination of Naturally Occurring Radioactive Material in Plastic Scintillator Material" Paper N36-119, IEEE Nuclear Science Symposium (2003) Conference Record, Portland, USA.

Geelhood et al., "Overview of Portal Monitoring at Border Crossings" Paper N24-7, IEEE Nuclear Science Symposium (2003) Conference Record, Portland, USA.

Patent Abstracts of Japan vol. 10, No. 154 (P-463), Jun. 4, 1986; JP61008693 a, Jan. 16, 1986, abstract; Figures 1, 2.

"Development of a Simplified Phoswich Detector Configured with Plastic Scintillator Blocks Coupled to Double Photomultiplier Tubes" Mesquita, C.H.; Hamada, M.M.; Rela, P.R. Nuclear Science Symposium and Medical Imaging Conference, Conference Record of the 1991 IEEE Volume, Nov. 2-9, 1991; pp. 208-212 vol. 1.

* cited by examiner

GAMMA RAY SPECTROMETERS

BACKGROUND OF THE INVENTION

The present invention relates to gamma ray detectors having scintillation bodies made from plastic scintillator material.

Scintillation counters are radiation detectors that exploit atomic or molecular excitation produced by radiation passing through matter. Subsequent de-excitation generates photons which can be measured to give an indication of the energy deposited in the detector by the radiation. Various materials can be used for this process, but broadly speaking, scintillation materials fall into two categories. These are inorganic materials, such as sodium iodide doped with an activator such as thallium (NaI(Tl)), and organic materials, which include plastics such as polyvinyltoluene. Plastic scintillation materials are made by adding scintillation chemicals (phosphors) to a plastic matrix. This composition gives a scintillation material that has a very short decay constant. Thus, scintillation counters based on plastic scintillation materials have the advantage of a very fast decay time (of the order of a few nanoseconds) and hence fast response, whilst also being relatively inexpensive.

Plastic scintillation counters are widely used for the detection of charged particles and neutrons in a variety of applications. However, this type of detector is not normally appropriate for the detection of gamma radiation since, for such applications, one requires a material having a high density and high atomic number. Also, plastic scintillation counters are poor at distinguishing between gamma rays of different energy. Nevertheless, very large plastic scintillation counters are currently used in applications in which it is important to detect a weak source of gamma radiation without a need to recognise the particular radioisotope that is generating the radiation. In other words, the energy of the gamma radiation is not of interest. For example, when a nuclear site is decommissioned, a final survey may be performed using large area plastic scintillators to ensure that all significant sources of radioactivity have been removed. For this purpose, it is not essential to be specific about the nature of the source.

There are a number of other situations in which it is important to detect the presence of radioactive materials very rapidly. For example, this may occur when such materials are carried by a person passing through a security check at an airport, or in a vehicle crossing a border check-point [1]. As a consequence, portal monitors that are able to detect a weak radioactive source (few μCi) within a fraction of a second have been constructed by a number of manufacturers (for example: TSA Systems, Ltd of 14320 Longs Peak Court, Longmont, Colo. 80504, USA; Polimaster Ltd of 112 M Bogdanovich Street, Minsk 220040, Republic of Belarus; Canberra Industries of 800 Research Parkway, Meriden, Conn. 06540, USA; and SAIC of 10260 Campus Point Drive, San Diego, Calif. 92121, USA). These detectors employ large area plastic scintillation counters that have dimensions of typically 200 cm by 7.6 cm by 7.6 cm. The optical signal from a scintillation event in such a detector is sensed using a photomultiplier optically coupled to the plastic. The light collection efficiency of many detectors used for this purpose is poor, so in some cases coincidence techniques are used to discriminate a genuine signal from system noise.

A disadvantage of the use of large portal monitors to scan commercial vehicles is the inability to distinguish between naturally occurring isotopes such as those in containers of glazed ceramic tiles and bananas, and those related to the illegal transport of nuclear materials or commonly used in medical diagnosis and treatment applications. The impact on the operation of a busy port of false identification of radioactive materials in a cargo can be highly detrimental. As a consequence, there is a need for detector systems which are both very sensitive and also able to identify particular isotopes, with the object of distinguishing naturally radioactive materials from illicit materials. One proposed approach is to record the ratio of the number of counts in several broad energy windows, but this provides only a crude indication of the identity of the source that has been detected by a large plastic portal monitor.

SUMMARY OF THE INVENTION

Accordingly, a first aspect of the present invention is directed to a gamma ray detector comprising: a plastic scintillation body for receiving gamma rays and creating photons therefrom, the scintillation body having a detection surface arranged to receive gamma rays and a thickness in a direction substantially orthogonal to the detection surface that is not greater than 5 cm; and at least one photodetector arranged to detect the photons and operable to generate an output signal in response to the detected photons that is related to energy deposited in the scintillation body by received gamma rays.

Plastic scintillator material has some desirable properties, in particular a fast decay time so that rapid measurements of radioactivity can be obtained using gamma ray detectors in the form of scintillation counters comprising a plastic scintillation body. However, for gamma ray detection, plastic may be considered as less suitable than inorganic scintillator materials such as sodium iodide, because high density materials with high atomic numbers can absorb more gamma rays and hence give better results. To obtain a reasonable degree of sensitivity with plastic scintillator material, a thick scintillation body is conventionally used, since this provides sufficient material to trap an adequate proportion of the gamma rays. Increasing thickness gives increasing sensitivity. Unfortunately, a thick scintillation body tends to distort the energy-loss spectrum through multiple interactions. This means that an increased sensitivity is offset by a decreased clarity in the spectrum. A large depth of scintillation material increases the chance of gamma rays undergoing secondary Compton scattering, which broadens the Compton edges in the recorded spectrum. This makes it difficult to identify the particular radioactive isotope.

The inventors of the present invention have recognised that, contrary to the conventional understanding, a thick scintillation body is not necessary when using plastic scintillator material. Instead, a thickness of only 5 cm or less can be used to obtain meaningful results. Compton scattering is thereby reduced so that a less distorted spectrum is measured, which allows any subsequent processing performed on the spectrum to be more precise. Any sensitivity that is lost by using a thin scintillation body can be regained by increasing the detection area of the scintillation body, so that the same or a greater volume of material is used. This counterintuitive approach allows the various benefits of plastic scintillation material to be exploited in detection systems that provide accurate radiation readings, so that fast response, large area, low cost gamma ray detectors can be fabricated.

According to various embodiments, the thickness is not greater than 4 cm, or not greater than 3 cm, or not greater than 2 cm, or not greater than 1 cm, or not greater than 0.5 cm, or the thickness is in the range 0.5 to 5 cm, or in the range 0.5 to 4 cm, or in the range 0.5 to 3 cm, or in the range 0.5 to 2 cm, or in the range 0.5 to 1 cm, or in the range 1 to 5 cm, or in the range 1 to 4 cm, or in the range 1 to 3 cm, or in the range 1 to 2 cm.

The detector may further comprise a processor provided with a response function representing a response of the detector to received gamma rays as a function of gamma ray energy, the processor operable to receive the output signal and use the response function and the output signal in a deconvolution process to determine an improved output signal that better represents the energy deposited in the scintillation body by received gamma rays. This embodiment allows the mathematical technique of deconvolution to be applied to the present invention. Deconvolution can be used to greatly improve the output spectrum of a radiation detector; the deconvolution process acts to identify an energy spectrum of incident radiation that is most likely to have resulted in the observed output spectrum by considering how the detector is known to respond to particular energies of incident radiation. In this way, the output of a detector of the present invention can be enhanced greatly, allowing individual isotopes to be accurately identified in a gamma ray source being measured. The thinness of the scintillation body is particularly relevant in this regard, because the deconvolution process can be more accurate if it operates on a spectrum with minimal distortion; the reduction of Compton scattering provided by the present invention assists in this.

Preferably, the response function is derived from mathematical simulations of the response of the detector to received gamma rays with a range of energies and/or from measurements of the response of the detector to received gamma rays with a range of known energies. Mathematical modelling such as Monte Carlo simulation can be used to predict the detector response over a wide range of gamma ray energies, for many individual energies within that range. Combining the results of such modelling with actual calibration data obtained by measuring the response of the detector to known sources with well-defined energies can improve the accuracy of the model as it can incorporate real information about the detector response which may have been overlooked or misrepresented in the model. Alternatively, sufficient accuracy may be obtained from simulations or calibration data only.

The detector may be configured such that the at least one photodetector detects photons from the scintillation body with an efficiency greater than 20%. This improves signal quality, and may be achieved using efficient photodetectors and ensuring good optical coupling between the photodetector and the scintillation body, for example.

The scintillation body may have a surface finish that promotes total internal reflection of the photons. This increases light collection efficiency by reducing the amount of photons that can escape from the surface of the scintillation body at positions away from the photodetector. More of the created photons are then available for detection by the photodetectors, to give a stronger output signal.

In some embodiments, the scintillation body may be substantially elongate in shape, having a first end and a second end at opposite ends of the detection surface. An elongate shape is particularly amenable to providing a detector with a detection surface that has at least one particularly large dimension, for example 1 to 2 meters or more in length.

In such embodiments the at least one photodetector may comprise a first photodetector positioned to detect photons at the first end and operable to generate a first output signal in response to photons detected and a second photodetector positioned at the second end and operable to generate a second output signal in response to photons detected, and the output signal related to energy deposited in the scintillation body by received gamma rays may be generated by summing the first output signal and the second output signal. The use of two photodetectors allows more photons to be collected, increasing the signal to noise ratio and hence giving a better result. Also, positioning the two photodetectors at opposite ends of the scintillation body and summing their outputs allows variations in output arising from the position of incidence of the gamma rays to be reduced.

Alternatively, the scintillation body may be substantially disc-shaped, the detection surface being substantially circular. A round detector may be found to be more convenient if a relatively compact detector is required.

It may be found necessary to compensate for a reduced sensitivity if a relatively small round scintillation body is used. The light collection efficiency can be enhanced by coupling the photodetector to the periphery of the disc and treating the surface of the scintillation body so as to reduce or avoid total internal reflection of the photons. For example, the scintillation body may be provided with a coating of a diffusively reflecting material. Magnesium oxide may be used for this purpose.

Further improvement that is particularly applicable to a round detector can be achieved if a portion of the scintillation body adjacent the at least one photodetector comprises material that transmits photons but does not create photons from received gamma rays; in other words, a non-scintillating material. This prevents photons from being generated close to the detector, which reduces the range of possible distances the photons have to travel to reach the detector and hence also reduces variance arising from attenuation of photons in the scintillator body.

A second aspect of the present invention is directed to a portal radiation monitor comprising at least one gamma ray detector according to the first aspect of the invention. Portal radiation monitors can benefit greatly from the present invention. In particular, such monitors desirably have a rapid response, since people and vehicles to be scanned tend to pass through the portal quickly. Also, large detection areas are required, particularly for scanning vehicles; this can readily be achieved with plastic scintillator material. Further, it is useful and often essential to be able to distinguish between different radioactive isotopes so that naturally occurring sources of radiation can be disregarded; embodiments of the present invention allow this to be achieved with plastic scintillation counters.

A third aspect of the present invention is directed to a handheld radiation monitor comprising a gamma ray detector with a substantially disc-shaped scintillation body according to embodiments of the first aspect of the invention. As indicated, a round scintillation body is well-suited for use in more compact and hence portable detectors, such as handheld designs.

A fourth aspect of the present invention is directed to a method of detecting gamma rays comprising: providing a plastic scintillation body having a detection surface for receiving gamma rays and a thickness in a direction substantially orthogonal to the detection surface that is not greater than 5 cm; exposing the detection surface to gamma rays so that the gamma rays are received by the scintillation body and photons are created therefrom; detecting the photons; and generating an output signal in response to the detected photons that is related to energy deposited in the scintillation body by the received gamma rays.

The thickness may be not greater than 4 cm, or not greater than 3 cm, or not greater than 2 cm, or not greater than 1 cm, or not greater than 0.5 cm, or in the range 0.5 to 5 cm, or in the range 0.5 to 4 cm, or in the range 0.5 to 3 cm, or in the range 0.5 to 2 cm, or in the range 0.5 to 1 cm, or in the range 1 to 5 cm, or in the range 1 to 4 cm, or in the range 1 to 3 cm, or in the range 1 to 2 cm.

The method may further comprise performing a deconvolution process using the output signal and a response function representing a response of the scintillation body to received gamma rays as a function of gamma ray energy to determine an improved output signal that better represents the energy deposited in the scintillation body by the received gamma rays. The response function may be derived from mathematical simulations of the response of the scintillation body to received gamma rays with a range of energies and/or from measurements of the response of the scintillation body to received gamma rays with a range of known energies. The photons may be detected with an efficiency greater than 20%. Also, the scintillation body may have a surface finish that promotes total internal reflection of the photons.

The scintillation body may be substantially elongate in shape, having a first end and a second end at opposite ends of the detection surface. The method may then comprise detecting the photons using a first photodetector positioned to detect photons at the first end and operable to generate a first output signal in response to photons detected and a second photodetector positioned to detect photons at the second end and operable to generate a second output signal in response to photons detected, and generating the output signal related to energy deposited in the scintillation body by the received gamma rays by summing the first output signal and the second output signal.

Alternatively, the scintillation body may be substantially disc-shaped, the detection surface being substantially circular. The scintillation body may be provided with a coating of a diffusively reflecting material. Also, a portion of the scintillation body may comprise material that transmits photons but does not create photons from the received gamma rays, and the method may comprise detecting the photons using a photodetector positioned adjacent the said portion and operable to generate the output signal.

BRIEF DESCRIPTION OF THE DRAWINGS

For a better understanding of the invention and to show how the same may be carried into effect reference is now made by way of example to the accompanying drawings in which.

DETAILED DESCRIPTION

Figure 1:
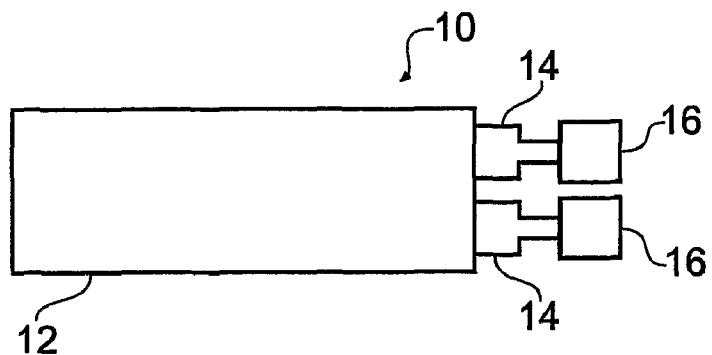
FIG. 1 shows a schematic representation of a scintillation counter according to the prior art.

FIG. 1 shows a simplified schematic representation of a conventional scintillation counter 10 of a design commonly used in existing portal radiation monitors. A scintillation body 12 formed from suitable scintillator material is optically coupled to a pair of photomultiplier tubes 14. The photomultiplier tubes 14 are abutted directly against the scintillation body 12, although light guides may be used to facilitate the optical coupling. The photomultiplier tubes 14 have associated processing electronics 16 operable to drive the photomultiplier tubes 14 and supply a signal indicative of the output of the photomultiplier tubes 14. Incoming radiation incident on the scintillation body causes excitation, and subsequent de-excitation creates photons which propagate through the scintillation body to the photomultiplier tubes where they are detected. The resulting output signal from the photomultiplier tubes generated in response to the detected photons is related to the energy of the radiation received by the scintillation body, and may be referred to as an energy loss spectrum, being a plot of count rate against the radiation energy deposited in the scintillation body. The detector includes two photomultiplier tubes to improve the light collection efficiency, which can be low with a single tube. A pair of tubes allows coincidence techniques to be used to distinguish genuine signals from noise.

Figure 2A:
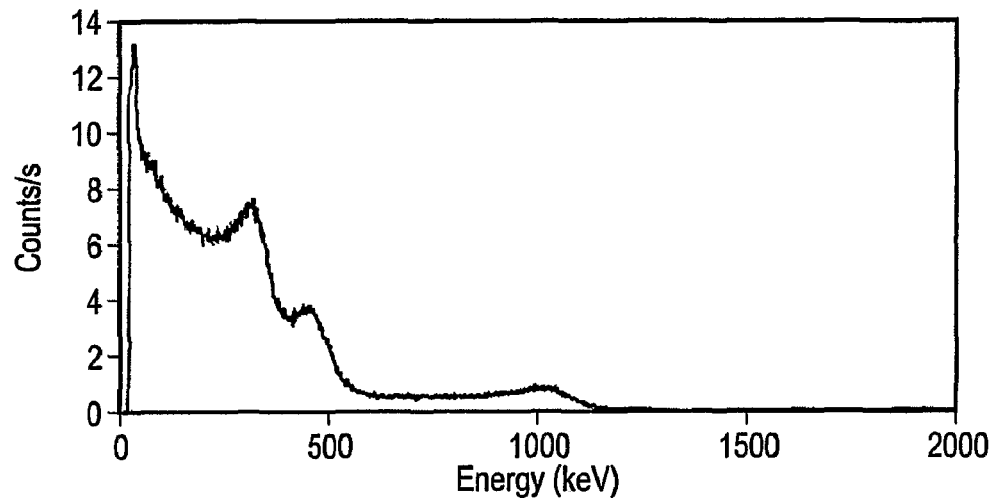
FIGS. 2a and 2b show energy loss spectra recorded for the same gamma ray source using a plastic scintillation counter and a NaI(Tl) scintillation counter respectively.
Figure 2B:
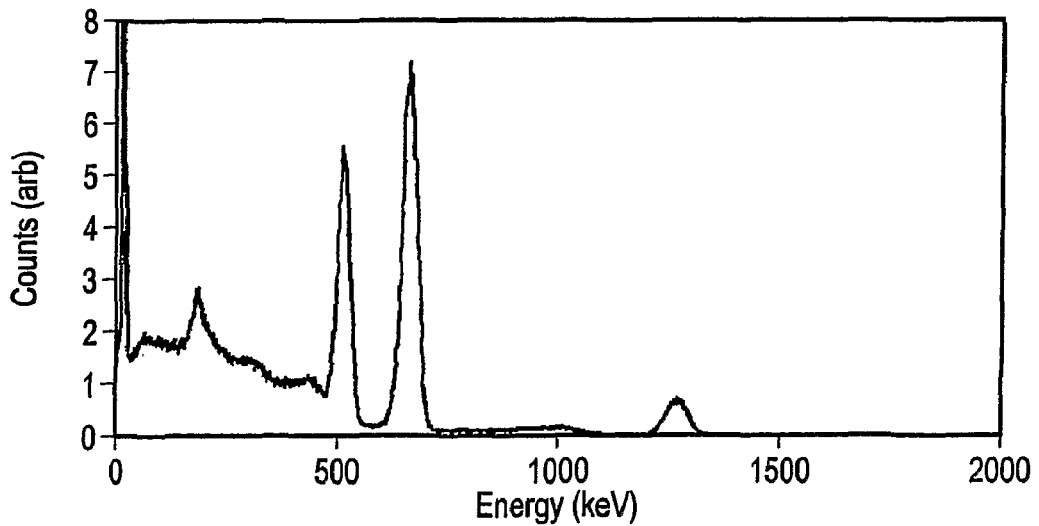

For the purposes of understanding the present invention, it is considered important to appreciate that, for measurements of gamma radiation, energy loss spectra recorded using a plastic scintillator are very different from spectra recorded using a more conventional detector, such as one based on NaI(Tl) scintillation material. FIG. 2a shows a spectrum recorded using a small plastic detector (2.5 cm by 2.5 cm radiation receiving surface) and FIG. 2b shows a spectrum recorded using a 5 cm by 5 cm NaI detector. Both detectors were illuminated by Na-22 and Cs-137 sources, giving gamma rays at three energies.

In the case of the plastic detector, Compton edges associated with each of the three energies are detected, whereas in the case of the NaI detector, full energy peaks are also clearly present, from which the various isotopes can be readily identified. The clarity of the Compton edges depends on the design of the detector; it is desirable that light collection efficiency is high and variance in the detected signal with the location of the gamma ray interaction is small. For the spectrum illustrated in FIG. 2a the plastic detector was configured to optimise these parameters. As can be seen, however, the energy loss spectrum is still poor compared to that obtained with the NaI detector. In existing monitors utilising plastic scintillation counters, such as portal monitors, the light collection efficiency achieved is usually non-optimal. As a consequence, the Compton edges are broadened and generally offer a relatively poor signature from which to identify the particular gamma ray emission.

Figure 3A:
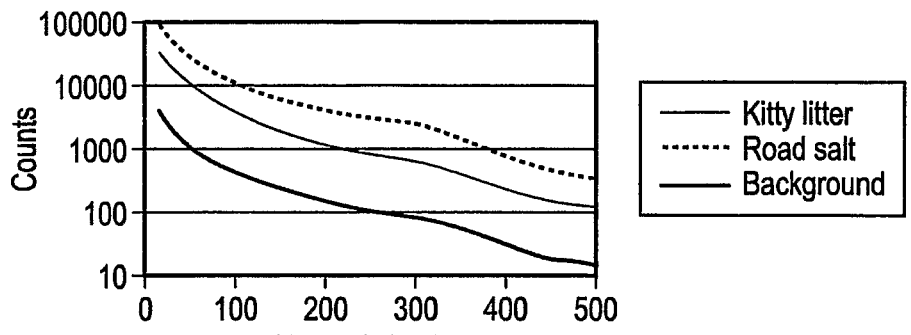
FIGS. 3a and 3b show energy loss spectra recorded for a range of radioactive material using a plastic scintillation counter according to the prior art.
Figure 3B:
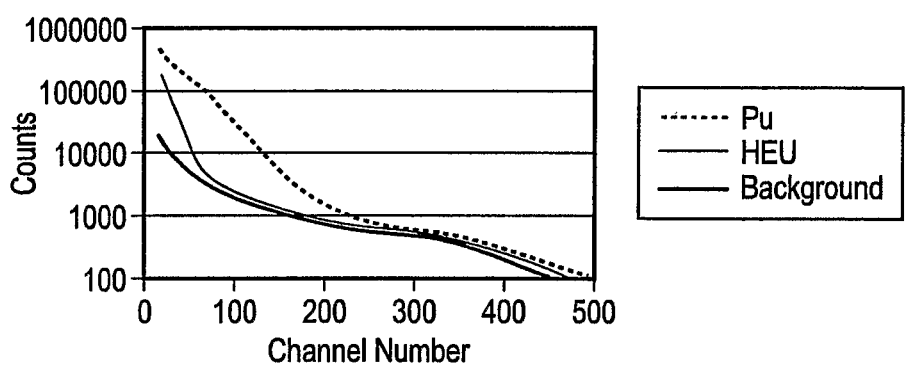

FIGS. 3a and 3b show examples of energy loss spectra that are typical of those recorded by a low efficiency plastic scintillator in a portal monitor [2]. FIG. 3a shows spectra obtained from naturally occurring radioactive material (cat litter and road salt) as compared to background radiation, and FIG. 3b shows spectra obtained from plutonium (Pu) and highly enriched uranium (HEU). All of the spectra are highly broadened through Compton scattering, and none have any distinct peaks that allow accurate identification of the different materials.

The present invention proposes using carefully designed plastic scintillators to provide much improved spectral information about a detected gamma ray source.

In particular, the present invention is concerned with dimensions of the plastic scintillation body used in the detector. The total volume of the scintillation body may be considered to provide a good indication of its sensitivity as a detector of energetic gamma radiation; a larger volume increases the chance of any given gamma ray being absorbed and hence detected. As the thickness of the scintillation plastic is increased, the amount of energy deposited in the detector increases, so that there is tendency for relatively thick scintillation bodies to be used. However, the present inventors have recognised that increasing the thickness leads to changes in the shape of energy loss spectra, as more of the gamma rays lead to multiple energy deposits in the plastic. Consequently, the energy loss spectra are less clearly unique to a given gamma ray energy, making it more difficult to identify individual isotopes. In particular, the Compton edges in the spectra become less distinct.

Figure 4:
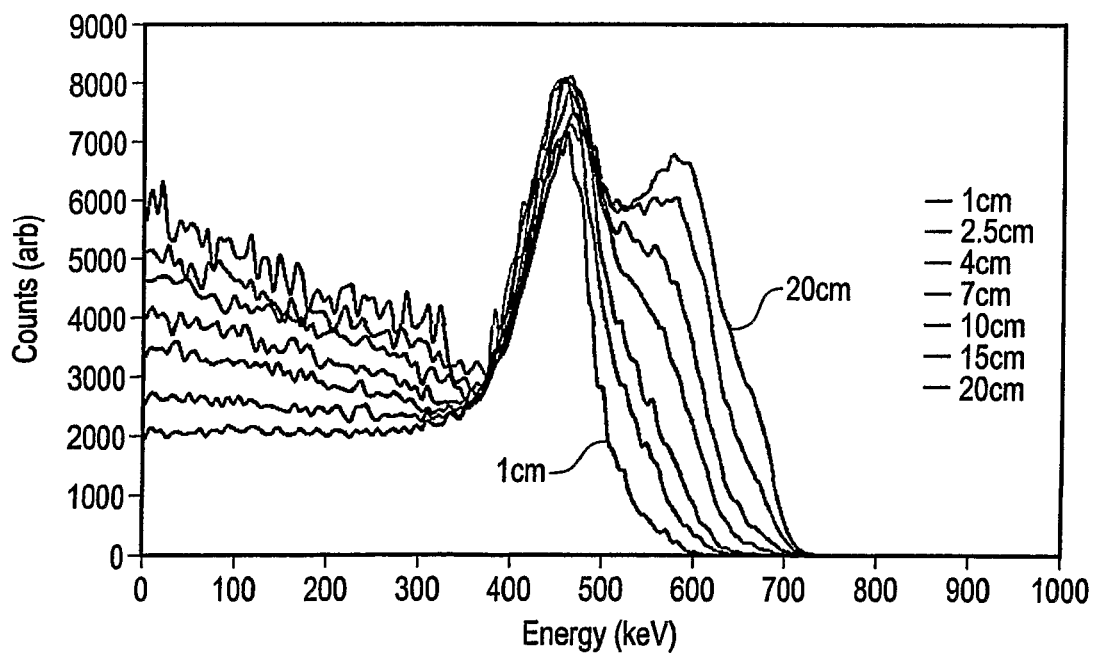
FIG. 4 shows simulated energy loss spectra obtained by modelling the output of plastic scintillation counters having plastic scintillation bodies of various thicknesses.

FIG. 4 shows a series of predicted energy loss spectra from a Cs-137 source measured with different thicknesses of scintillation body, ranging from 1 to 20 cm (all spectra are normalised to the peak value). The definition of the spectral peaks diminishes with increasing thickness, illustrating that the plastic scintillation body can be made too thick for useful measurements.

To address this, it is proposed to impose an upper limit on the thickness of the scintillation body. Research indicates that a useful upper limit is 5 cm, so that the present invention is directed to gamma ray detectors having scintillation bodies with a thickness of 5 cm or less. As can be seen from FIG. 4, above this thickness, the undesirable broadening of the energy loss spectrum becomes significant. To improve sensitivity, the volume of the scintillation body can be increased by increasing the detector area; this is preferable to increasing thickness, because the spectral resolution can be maintained. Also, it is particularly applicable to applications such as vehicle portal monitors, where a large object has to be scanned.

The area of the detector is the surface area of the face of the scintillation body that is presented to the source of radiation, through which incident gamma rays pass into the scintillation body for detection. This may be referred to as a detection surface. The thickness of the scintillation body is the dimension substantially perpendicular to this face. For a thickness of 5 cm or less, the design of the detector is preferably driven by the aim of maximising light collection efficiency, to obtain the best possible performance from the detector. Of particular importance is the light receiving area of the photomultiplier tube or other photodetector used. For efficient light collection, this should be matched to the area of the side or end of the scintillation body to which the photodetector is coupled. Hence, for a generally rectangular scintillation body, once the thickness is chosen in accordance with the maximum of 5 cm, the orthogonal dimension of the relevant coupled side will be defined by the area required to match that of the photodetector.

According to the invention, a more accurate and sensitive detector can be obtained by using a thinner scintillation body. Thus, the thickness of 5 cm is an upper limit, and thinner bodies may be used. Any undesirable loss in sensitivity resulting from thinning the body and hence reducing the volume of scintillation material available to absorb gamma rays can be compensated for by increasing the other dimensions of the scintillation body. Therefore, according to various embodiments, the thickness of the scintillation body can be specified to be not greater than 4 cm, or 3 cm, or 2 cm, or 1 cm, or 0.5 cm. Further, in other embodiments, the thickness can be specified as falling within a particular range, for example 0.5 to 5 cm, 0.5 to 4 cm, 0.5 to 3 cm, 0.5 to 2 cm, 0.5 to 1 cm, 1 to 5 cm, 1 to 4 cm, 1 to 3 cm, or 1 to 2 cm.

Various other features according to embodiments of the invention may be implemented in a plastic scintillation counter to further enhance the improvement provided by utilising a limited thickness plastic scintillation body for gamma ray detection. In particular, a thin scintillation body has been found to be particularly advantageous when used in conjunction with deconvolution of the raw energy loss spectrum.

Spectral deconvolution is a technique that has been previously proposed for improving the output of radiation detectors [3]. If a sufficiently detailed knowledge can be obtained of how a detector responds to a wide range of radioactive sources with known signature energy spectra, a particular source can be identified by using the mathematical process of deconvolution to compare the spectrum measured for that source with a response function for the detector that represents the various known responses.

Mathematical modelling such as a Monte Carlo simulation can be used to predict the way in which a particular detector with a plastic scintillation body will respond to incident gamma ray photons at any energy within a range of interest. The range should cover at least all energies which the detector is expected to be used to detect. For enhanced accuracy, the information obtained from the simulation may usefully be combined with calibration data in the form of measured energy loss spectra showing how the detector actually responds to gamma rays at a number of discrete known energies within the same range of interest. This data may be acquired by using a number of known radioactive sources ranging in energy from about 60 keV to 2.6 MeV (for example) to illuminate the detector. This may be achieved by placing a series of well-collimated sources at different locations on the scintillation body. A range of locations should be included to determine how the response varies with position along the scintillation body, so that the measurements include information relating to positions at which gamma rays are incident on the detection surface of the scintillation body. Variation in response owing to position arises for reasons such as photons generated far from the photomultiplier having a greater chance of being absorbed by the scintillation material and not being detected, and photons generated close to the surface having a greater possibility of escaping and not being detected. This is of particular significance for large area scintillation bodies, where the range of possible separations between source and photomultiplier tube is much greater.

The Monte Carlo simulation data and the calibration data are combined to give a single response function for the detector, representing how the detector can be expected to respond to any given gamma ray source (i.e. what energy loss spectrum will be produced). Thus, an accurate model of the way the detector responds as a function of incident gamma ray energy is obtained. Computational physics methods can then be applied to derive the most probable incident spectrum that is consistent with an observed energy loss spectrum measured by the detector. Thus, the output signal from the detector is improved, and represents the energies of the received gamma rays more accurately.

Generally, the observed raw energy loss spectrum O(E) can be represented by the integral:

$$O(E) = \int_0^\infty R(E, E_0) \cdot I(E_0) dE_0$$

where I(E) is the actual spectrum incident on the detector, and $R(E, E_0)$ is the detector response function. This equation can be discretised as:

$$\begin{bmatrix} O_1 \\ \vdots \\ O_m \end{bmatrix} = \begin{bmatrix} R_{11} & R_{12} & \ldots & R_{1n} \\ \vdots & \vdots & \vdots & \vdots \\ R_{m1} & R_{m2} & \ldots & R_{mn} \end{bmatrix} \times \begin{bmatrix} I_1 \\ \vdots \\ I_n \end{bmatrix} + \begin{bmatrix} \varepsilon_1 \\ \vdots \\ \varepsilon_m \end{bmatrix}$$

where $\varepsilon_i (i=1,\ldots,m)$ is a contribution from noise and $R_{ij}$ is the probability that an incident gamma ray having an energy falling into a range represented by bin i will be detected as having an energy falling into a range represented by bin j. In-depth descriptions and reviews of methods that can be used in solving this equation by deconvolution to determine the incident spectrum can be found elsewhere [4, 5].

With regard to calibration of the detector to derive the response function, care should be taken to measure the calibration data accurately. The energy response of a plastic scintillator as a function of gamma ray energy should preferably not be measured using standard calibration techniques applied to conventional detectors such as NaI spectrometers since a full energy peak is rarely observed. Instead, the response may be calibrated using minimum ionising particles such as cosmic ray muons or energetic electrons generated for example by a Sr-90 beta-decay source.

The improved performance offered by the above deconvolution spectrum processing technique can be further enhanced if the opportunity is taken to configure the detector so that light collection efficiency is maximised and variance in the signals recorded when a gamma ray with energy $E_\gamma$ interacts in the scintillation body is minimised.

Figure 5:
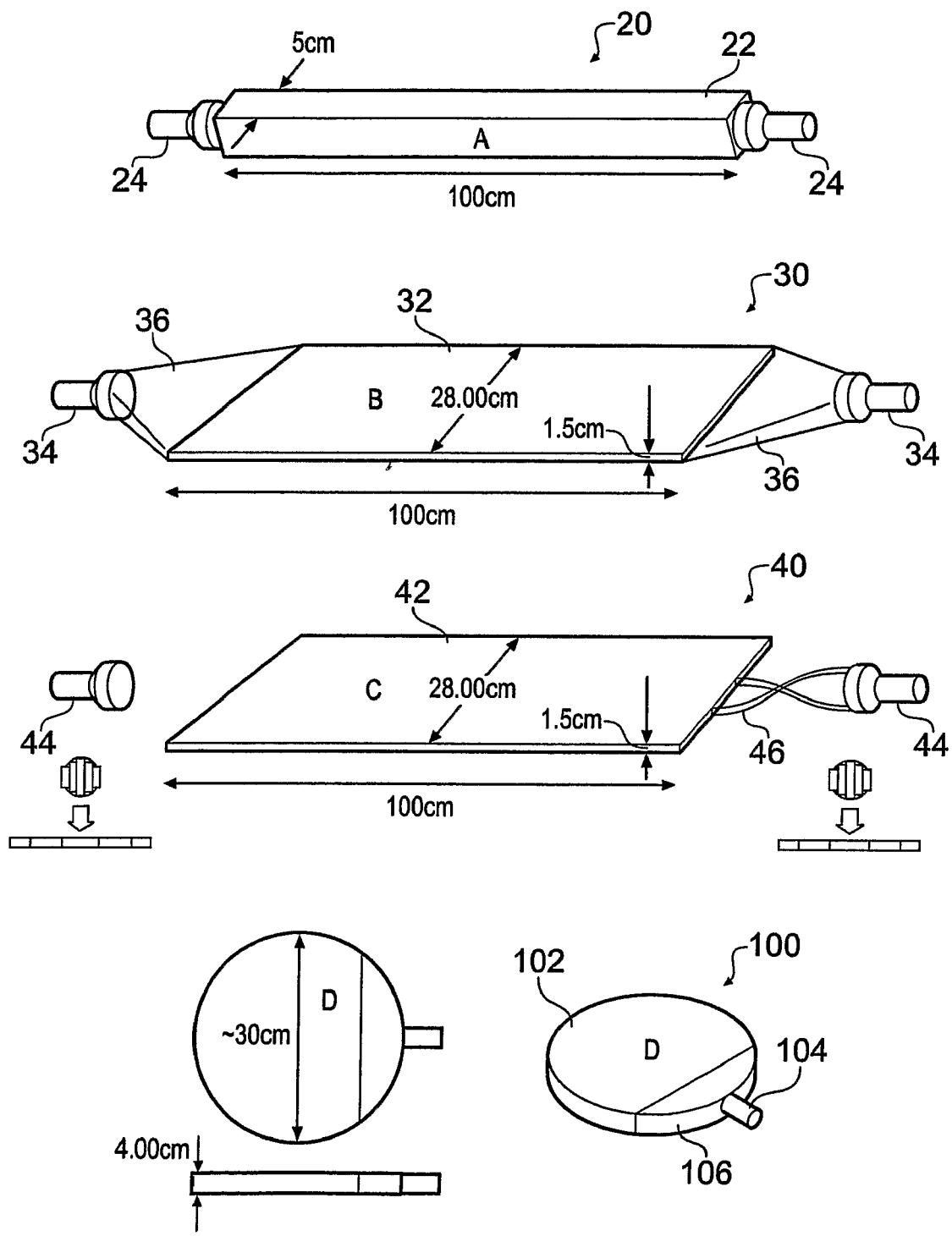
FIGS. 5A to 5D show schematic representations of gamma ray detectors according to embodiments of the present invention.

Optimising and preferably maximising the efficiency of the photomultiplier tube or other photodetector used to measure the energy deposited in the plastic scintillator will minimise the statistical fluctuations in the measured signal. A good light collection efficiency in a large area detector can be realised by matching the light receiving area of the photomultiplier tube to the area of the part of the scintillation body that is viewed by the photomultiplier tube. Typically, these two areas will be different in shape. If so, rather than abutting the photomultiplier tube directly against the scintillation body, a light guide can be used to couple the two components together, which operates by channelling light leaving the scintillation body into the photomultiplier. Examples include a tapering light guide having a shape which tapers between a first end that matches the scintillation body area and a second end that matches the photomultiplier tube, and a strip light guide in which the scintillation body area is divided into strips each of which is coupled to the photomultiplier tube area by a separate light guiding portion, the portions being arranged to match the two areas. A strip light guide typically provides a higher light collection efficiency. Examples of these different configurations are shown in FIG. 5, discussed below. Advantageously, one should aim to provide a light collection efficiency whereby photons are detected from the scintillation body with an efficiency of better than 20% in order to derive a good quality performance with a detector comprising a large area plastic scintillation body.

In detectors according to the present invention, the light collection efficiency can also be improved by providing the scintillation body with a surface finish that promotes efficient propagation of the scintillation photons to the photomultiplier tube by total internal reflection. This aims to ensure that as few photons as possible are lost by coupling out of the surface of the scintillation body. Suitable surface finishes for promoting total internal reflection in plastic scintillator material include polished or diamond milled surfaces.

As indicated above, the quality of operation of a thin plastic scintillation counter can also be enhanced by minimising variations in the signal detected by the photodetector when gamma rays of the same energy interact in different regions of the scintillation body. The potential variation increases with increasing scintillation body area, so it is recommended that attention is paid to this point particularly when large area scintillation bodies are employed. Photons generated from gamma rays incident remote from the photodetector have a greater chance of absorption than photons generated from gamma rays of the same energy incident close to the photodetector, so that different responses will be measured for identical gamma ray exposure, depending on the location of incidence. This can be partly addressed by using materials for the plastic scintillation body that have a long attenuation length, so that attenuation is low even for large area detectors. The attenuation length of scintillation photons in plastic can be in excess of 2 m, so that this approach can be effective. It is important to make the appropriate trade-off between light yield, decay time and self-attenuation of the scintillator material selected.

Further in this regard, it is proposed here to collect the scintillation light at two opposite ends of the scintillation body, by coupling two photomultiplier tubes or other photodetectors to the scintillation body. This arrangement increases the size of the detected signal (more photons can be collected) to improve the light collection efficiency, and can also be used to minimise spatial variations in the detected signal arising from variations in the position of incidence of incoming gamma rays. By summing the signals measured with the two photodetectors to obtain the raw energy loss spectrum, spatial dependence is reduced and the gains of the photodetectors are normalised. This technique can reduce the variance in the signals with position of the interaction along the scintillation body to less than 5%. This is of particular relevance to large area detectors having a length of a similar magnitude to the photon attenuation length.

FIG. 5 shows schematic representations of some example plastic scintillation detectors according to embodiments of the invention. FIG. 5A shows a detector 20 having a plastic scintillation body 22 which measures 5 cm by 5 cm by 100 cm. Any of the four sides measuring 5 cm by 100 cm can be used as the detection surface to receive incident radiation. A photodetector 24 is positioned at each of the 5 cm by 5 cm ends of the scintillation body. These ends each have a small, square, area which can be approximately matched by the light receiving aperture of a photodetector such as a photomultiplier tube, so that good light collection efficiency can be provided by abutting the photodetectors 24 directly against the scintillation body 22. Refractive index matching adhesive can be used to fix the photodetectors in place.

In FIG. 5B, an alternative arrangement is shown, in which a detector 30 comprises a scintillation body 32 measuring 1.5 cm by 28 cm by 100 cm. Thus, the scintillation body 32 is thinner than that of the detector in FIG. 5A, but has a larger area. Either of the 28 cm by 100 cm sides can be the detection surface used to collect radiation. Again, a photodetector 34 is provided at each end of the scintillation body 32. However, the ends have an elongate area measuring 1.5 cm by 28 cm, which cannot easily be directly matched to the light receiving aperture of a photodetector. Therefore, tapered light guides 36 are positioned between the scintillation body 32 and the photodetectors 34 to channel light from the former to the latter. This design has similar light collection efficiency to that of FIG. 5A, but provides a clearer raw energy loss spectrum as the input to the deconvolution process. This is a consequence of the lower probability of a second Compton scattering process taking place in the thinner slab of scintillator material.

A further example of a detector having a similar configuration to that shown in FIG. 5B is one particularly well-suited for use in a vehicle portal monitor and having a scintillation body measuring 200 cm long by 22 cm wide by 2 cm thick. Photomultiplier tubes are coupled to each end of the scintillation body via tapered light guides. Plastic scintillator material having a long photon attenuation length should be used, owing to the particularly long length of the scintillation body separating the photomultiplier tubes FIG. 5C shows a detector 40 having a scintillation body 42 of the same dimensions as that of the detector of FIG. 5B. In this example, a strip light guide is used to couple light from the scintillation body 42 to the photodetectors 44 arranged at each end of the scintillation body 42. For the sake of clarity, only the central strip in the light guide 46 is illustrated in position between the scintillation body 42 and a photodetector 44, but an inset below shows five differently-sized strips arranged end-to-end along the scintillation body which are twisted around and stacked side-by-side to couple into the photodetector 44. In this way, the elongate shape of the scintillator body end is matched to the circular shape of the photodetector light receiving aperture.

In each of these examples, the four sides of the scintillation body are preferably provided with surface finishes that give total internal reflection of the scintillation photons, to improve light collection efficiency by reducing surface losses. Also, each example has a scintillation body that is elongate with rectangular faces, having first and second ends at opposite ends of the detection surface to which the photodetectors are coupled. However, the invention is not so limited, and other shapes of scintillation body may be used, with one or two photodetectors. The requirement is merely that the body have a thickness not exceeding 5 cm.

FIG. 5D shows a further example of detector 100. In this case, the scintillation body 102 is disc-shaped, with a diameter of about 30 cm and a thickness of 4 cm. Thus, the detection surface is circular. A single photodetector 104 is coupled to the rim of the disc. This configuration provides a more compact detector than those of FIGS. 5A-5C, suitable for use as a hand-held radiation monitor, for example. The photodetector may be housed in a handle assembly for this purpose. The smaller sensitivity compared to the above larger volume detectors can be offset by packaging the scintillation body within a coating of a (preferably white) diffusively reflecting material such magnesium oxide. This increases the light collection efficiency. Disc-shaped detectors of this kind may usefully be made with dimensions up to 40 cm diameter and 5 cm thickness. To further improve performance, a portion 106 of the disc nearest to the photodetector 104 may be made of a photon-transmitting but non-scintillating material. This means that no gamma rays are absorbed and hence no photons are generated very close to the photodetector, which reduces the variance in position and photon attenuation.

Reflective coatings and portions of non-scintillating material can also be used with other shapes of scintillation body to provide the same advantages.

Figure 6:
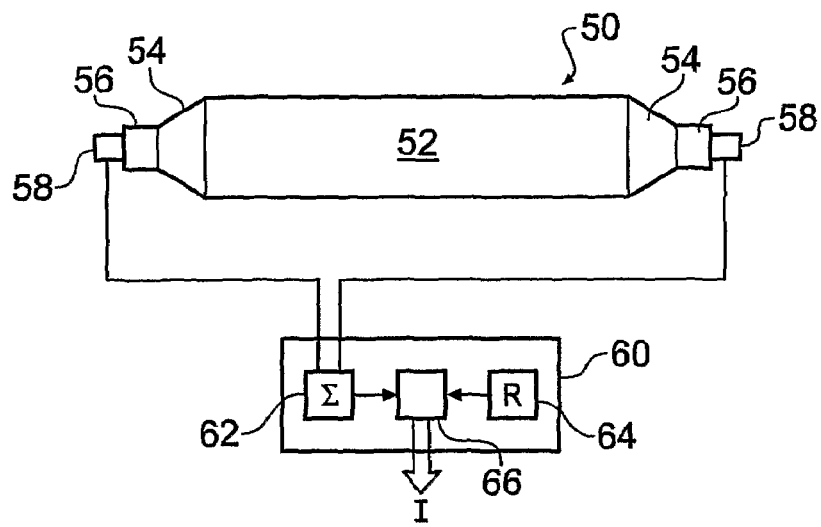
FIG. 6 shows a schematic representation of a gamma ray detector according to a further embodiment of the present invention.

FIG. 6 shows a schematic representation of a further example of a detector in accordance with an embodiment of the invention. In this example, a processor operable to perform the deconvolution is included; similar or alternative processors can also be used with the detectors shown in FIG. 5. The detector 50 of FIG. 6 comprises a scintillation body 52 coupled at each end to a photodetector 56 by a light guide 54. Each photodetector 56 has a control unit 58 that may contain any electronics required to drive the photodetector (depending on its type) and may further be operable to perform some pre-processing of the photodetector outputs such as noise filtering or spectral filtering. Alternatively, if appropriate, the outputs of the photodetectors 56 can be used directly, so that the control units 58 can be omitted.

The detector 50 further comprises a processor 60, which receives the outputs of the two photodetectors 56. The outputs are fed to a summing device 62 within the processor, which sums the two outputs as discussed above, and provides a single combined energy loss spectrum representing the response of the detector to the incident radiation. This spectrum is fed to a deconvolutor 66 within the processor 60. The processor 60 also includes memory 64 in which the detector response function R is stored. The deconvolutor 66 retrieves the response function R from the memory 64 and uses the response function R and the energy loss spectrum to perform the deconvolution required to determine an enhanced spectrum that is as close as possible to the original incident spectrum I.

Results obtained using a plastic scintillation detector according to an embodiment of the invention are now presented. The detector comprised a small area scintillation body 2.5 cm in diameter and 2.5 cm thick and was configured so as to maximise its light collection efficiency and to minimise the variance in the signals generated. It was illuminated with a number of multi-component gamma ray sources.

Figure 7A:
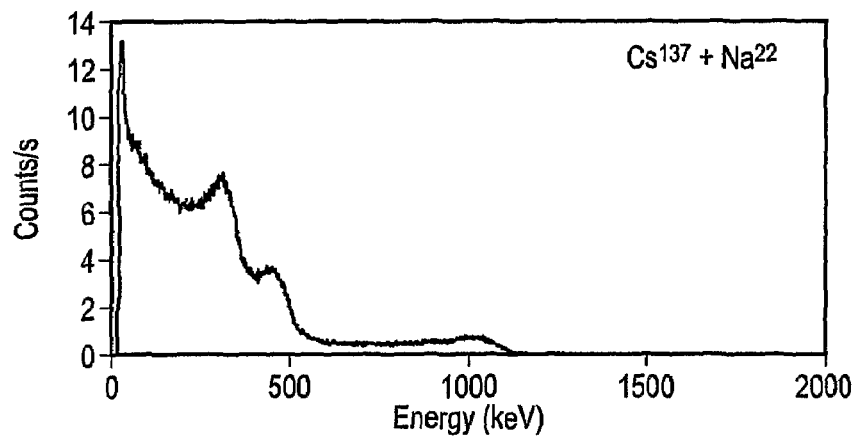
FIGS. 7a and 7b show a raw energy loss spectrum and a processed energy loss spectrum obtained from the raw energy loss spectrum by deconvolution.
Figure 7B:
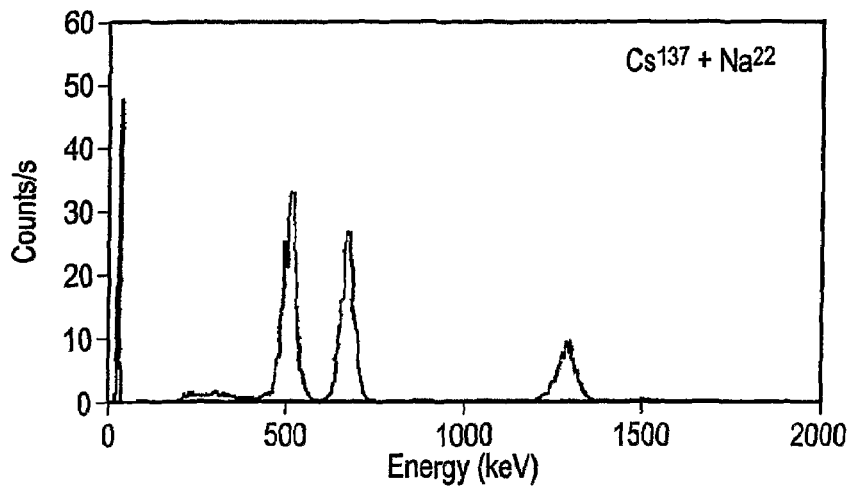
Figure 7C:
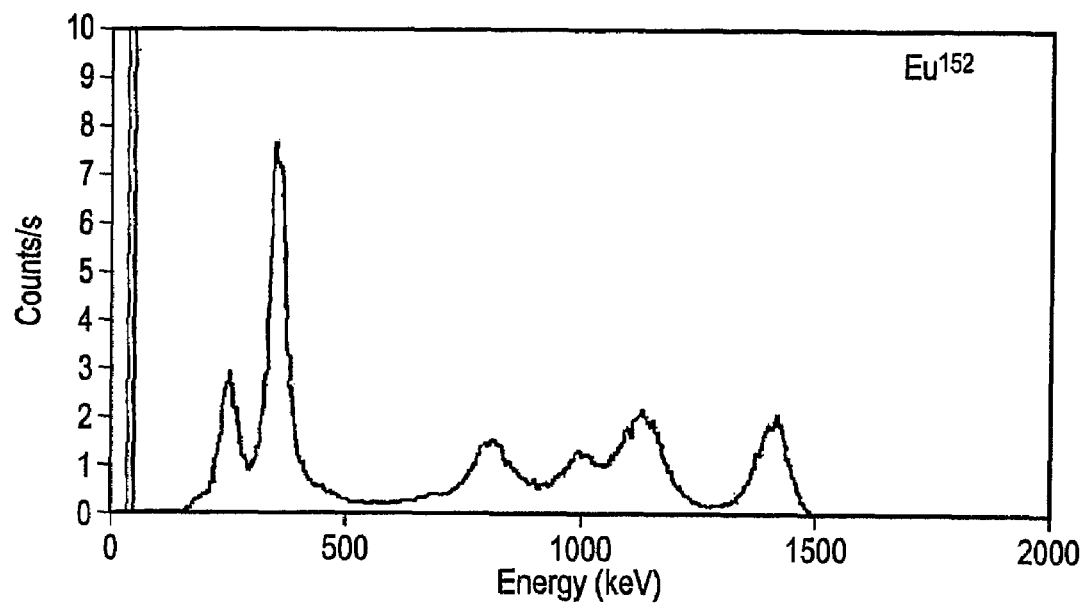
FIGS. 7c and 7d shows further processed energy loss spectra, each obtained using a gamma ray detector according to an embodiment of the present invention.
Figure 7D:
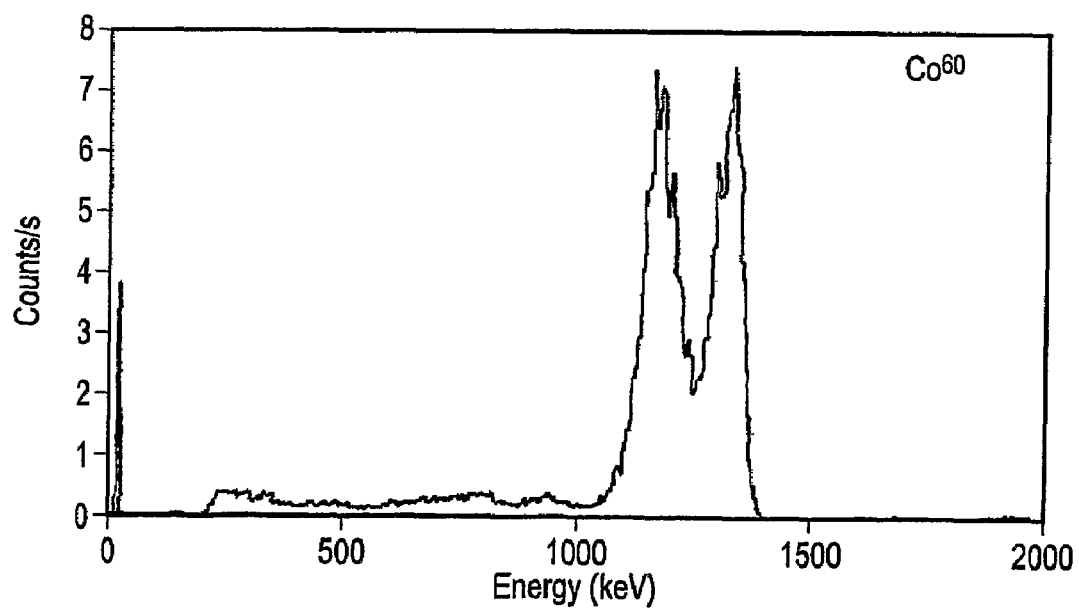

FIG. 7a shows the raw energy loss spectrum measured for a source comprising Na-22 and Cs-137. FIG. 7b shows the same spectrum after deconvolution processing. A comparison of the two spectra shows how the Compton edges and generally broadened nature of the raw spectrum are replaced by precise peaks corresponding to the various gamma ray energies of the isotopes, from which the isotopes can be clearly identified. FIGS. 7c and 7d show examples of processed spectra obtained from raw measurements made by illuminating the detector with Eu-152 and Co-60 respectively.

For many gamma ray detection applications, speed is important. The source to be detected may not be present in the vicinity of the detector for very long. For this reason, plastic scintillator material is of interest, because of its very short decay time. Rapid processing of measurements is also important with regard to quickly obtaining a reliable reading. The deconvolution software used to obtain the results included herein takes around 3 seconds to convert a 512-channel raw energy loss spectrum into a high resolution processed version of that spectrum when run on a 1 GHz notebook computer. New parallel processor computer technology is expected to accelerate this process at least 64-fold, providing a very fast detection system. This will be important for applications such as the use of portal monitors to scan cargo containers passing at 20 mph, where a decision on the container contents must be made in typically 250 ms.

As discussed, a detection application to which the present invention is considered to be particularly relevant is that of portal radiation monitors. Plastic scintillation counters have a fast response and can be made in large sizes for a relatively low cost, both characteristics being of interest for portal monitors. Aspects of the present invention are directed to obtaining good quality measurements from plastic scintillation counters, so that the performance of portal monitors can be improved. In particular, individual isotopes can be reliably distinguished.

A portal monitor comprises two upright pillars between which an object such as a person or a vehicle to be scanned for the presence of radioactive material passes. The pillars may be connected at the top by a horizontal cross member (not shown). The dimensions of the pillars will be chosen appropriately to extend at least to the maximum height of an expected vehicle or person, with an extent in the direction of movement chosen for convenience and sensitivity; a vehicle portal will typically extend further than a personnel portal. Radiation detectors are disposed within each pillar, also extending over dimensions appropriate to the size of the object to be scanned. The outputs of the detectors are fed to a processor for processing and for providing an indication of the result of a scan to an operator. An alarm may be provided which is triggered when a certain level or type of radioactivity is detected. Thus, it will be appreciated that gamma ray detectors according to the present invention are well suited to this application. Large area detectors are desirable since the objects to be scanned are large, and a quick and accurate result is required since the objects pass quickly through the portal.

Figure 8A:
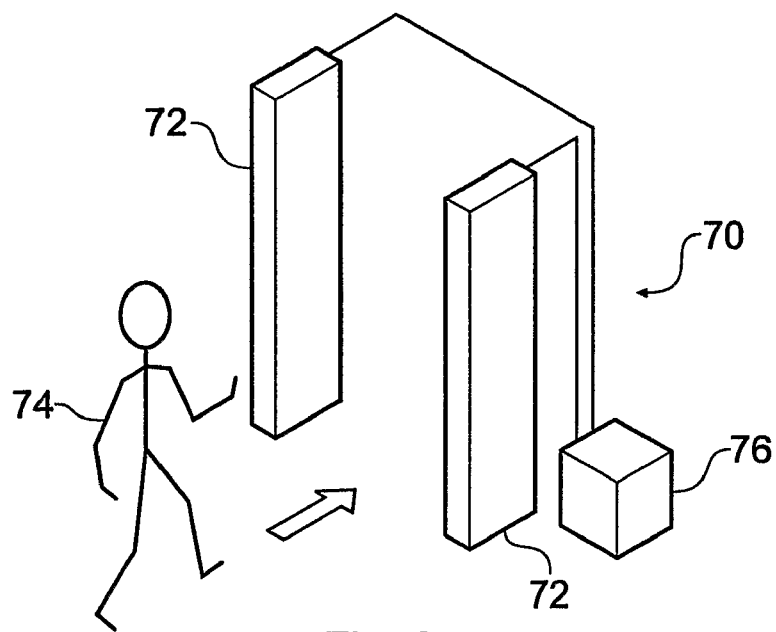
FIGS. 8a and 8b show simplified schematic representations of portal monitors embodying aspects of the present invention.
Figure 8B:
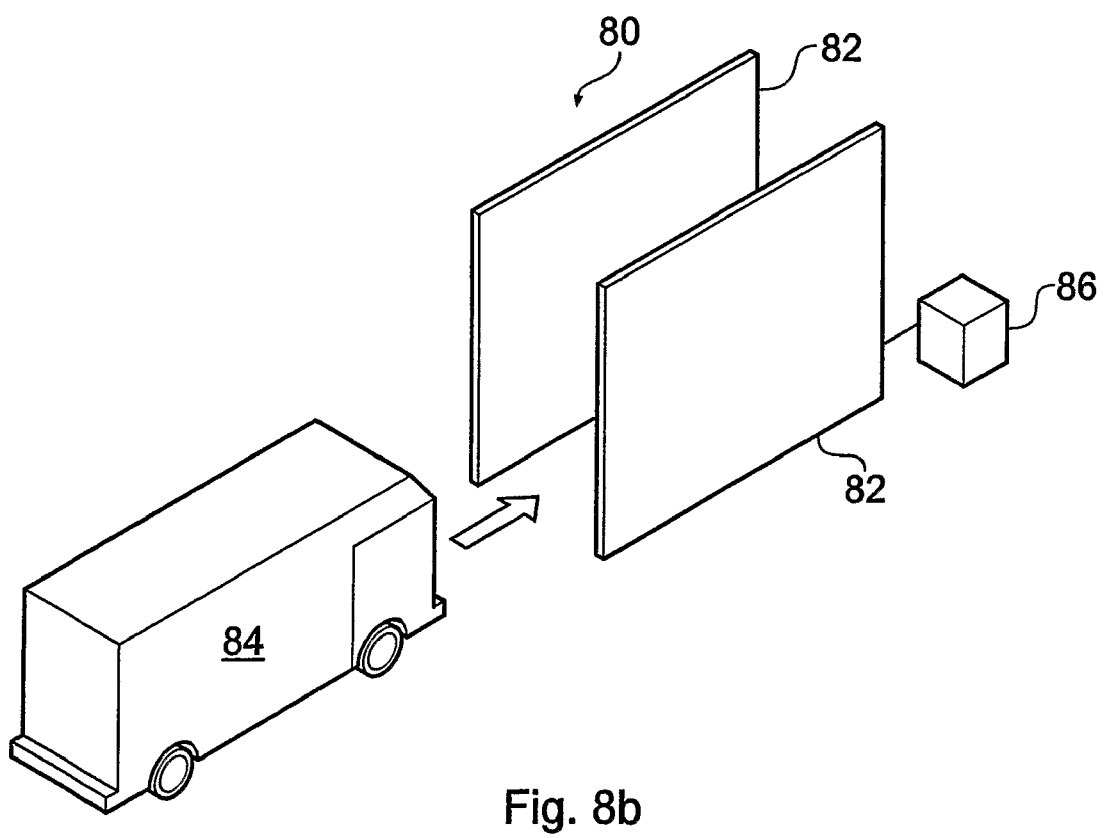

FIG. 8a shows a simplified schematic representation of a personnel portal 70, in which two upright pillars 72 each housing a gamma ray detector in accordance with the invention (not shown) are arranged so that a person 74 may walk between them. The pillars 72 extend in height above the height of the person 74, but have a much lesser extent in the horizontal direction. Detectors of a size appropriate for scanning a person can thereby be accommodated. FIG. 8b shows a simplified schematic representation of a vehicle portal 80, in which two upright pillars 82 each housing a gamma ray detector in accordance with the invention (not shown) are arranged so that a car or lorry 84 may drive between them. The pillars 82 extend in height above the height of the vehicle 84, but have a greater extent in the horizontal direction, to house detectors matched to the relative dimensions of the vehicle 84. However, reliable vehicle scanning may be achieved using detectors and hence pillars that extend along the length of the vehicle by a lesser amount that the total vehicle length. In both examples, a processor 76, 86 to provide a readout is connected to each detector.

REFERENCES

[1] B Geelhood et al, "Overview of portal monitoring at border crossings", Paper N24-7, IEEE Nuclear Science Symposium (2003) Conference Record, Portland, USA.
[2] J H Ely et al, "Discrimination of naturally occurring radioactive material in plastic scintillator material", Paper N36-119, IEEE Nuclear Science Symposium (2003) Conference Record, Portland, USA
[3] WO 02/31536
[4] M J Berger and S M Seltzer, "Response function for sodium iodide scintillation detectors", Nuclear Instruments & Methods, A104, 317-332, 1972
[5] L J Meng and D Ramsden, "Inter-comparison of three algorithms for gamma-ray spectral deconvolution", IEEE Trans. Nuclear Science 47, 1329-1336, 2000

The invention claimed is:

1. A gamma ray spectrometer comprising:
a gamma ray detector comprising:
a plastic scintillation body for receiving gamma rays and creating photons therefrom, the scintillation body having a detection surface arranged to receive gamma rays and a thickness in a direction substantially orthogonal to the detection surface that is not greater than 5 cm; and
at least one photodetector arranged to detect the photons and operable to generate an output signal in response to the detected photons that is related to energy deposited in the scintillation body by received gamma rays;
and further comprising a processor provided with a response function representing a response of the detector to received gamma rays as a function of gamma ray energy, the processor operable to receive the output signal and use the response function and the output signal in a deconvolution process to determine an improved output signal that better represents the energy spectrum of incident gamma rays.

2. A gamma ray spectrometer according to claim 1, in which the thickness is not greater than 4 cm, or not greater than 3 cm, or not greater than 2 cm, or not greater than 1 cm, or not greater than 0.5 cm.

3. A gamma ray spectrometer according to claim 1, in which the thickness is in the range 0.5 to 5 cm, or in the range 0.5 to 4 cm, or in the range 0.5 to 3 cm, or in the range 0.5 to 2 cm, or in the range 0.5 to 1 cm, or in the range 1 to 5 cm, or in the range 1 to 4 cm, or in the range 1 to 3 cm, or in the range 1 to 2 cm.

4. A gamma ray spectrometer according to claim 1, in which the response function is derived from mathematical simulations of the response of the detector to received gamma rays with a range of energies and/or from measurements of the response of the detector to received gamma rays with a range of known energies.

5. A gamma ray spectrometer according to claim 1, configured such that the at least one photodetector detects photons from the scintillation body with an efficiency greater than 20%.

6. A gamma ray spectrometer according to claim 1, in which the scintiliation body has a surface finish that promotes total internal reflection of the photons.

7. A gamma ray spectrometer according to claim 1, in which the scintillation body is substantially elongate in shape, having a first end and a second end at opposite ends of the detection surface.

8. A gamma ray spectrometer according to claim 7, in which the at least one photodetector comprises a first photodetector positioned to detect photons at the first end and operable to generate a first output signal in response to photons detected and a second photodetector positioned to detect photons at the second end and operable to generate a second output signal in response to photons detected, and the output signal related to energy deposited in the scintillation body by received gamma rays is generated by summing the first output signal and the second output signal.

9. A gamma ray spectrometer according to claim 1, in which the scintillation body is substantially disc-shaped, the detection surface being substantially circular.

10. A gamma ray spectrometer according to claim 9, in which the scintillation body is provided with a coating of a diffusively reflecting material.

11. A gamma ray spectrometer according to claim 9, in which a portion of the scintillation body adjacent the at least one photodetector comprises material that transmits photons but does not create photons from received gamma rays.

12. A portal radiation monitor comprising at least one gamma ray spectrometer according to claim 1.

13. A handheld radiation monitor comprising a gamma ray spectrometer according to claim 1.

14. A method of measuring an energy spectrum for gamma rays comprising:

providing a plastic scintillation body having a detection surface for receiving gamma rays and a thickness in a direction substantially orthogonal to the detection surface that is not greater than 5 cm;

exposing the detection surface to gamma rays so that the gamma rays are received by the scintillation body and photons are created therefrom;

detecting the photons; and generating an output signal in response to the detected photons that is related to energy deposited in the scintillation body by the received gamma rays;

and further comprising performing a deconvolution process using the Output signal and a response function representing a response of the detector to received gamma rays as a function of gamma ray energy to determine an improved output signal that better represents the energy spectrum of incident gamma rays.

15. A method according to claim 14, in which the thickness is not greater than 4 cm, or not greater than 3 cm, or not greater than 2 cm, or not greater than 1 cm, or not greater than 0.5 cm.

16. A method according to claim 14, in which the thickness is in the range 0.5 to 5 cm, or in the range 0.5 to 4 cm, or in the range 0.5 to 3 cm, or in the range 0.5 to 2 cm, or in the range 0.5 to 1 cm, or in the range 1 to 5 cm, or in the range 1 to 4 cm, or in the range 1 to 3 cm, or in the range 1 to 2 cm.

17. A method according to claim 16, in which the response function is derived from mathematical simulations of the response of the detector to received gamma rays with a range of energies and/or from measurements of the response of the detector to received gamma rays with a range of known energies.

18. A method according to claim 14, in which the photons are detected with an efficiency greater than 20%.

19. A method according to claim 14, in which the scintillation body has a surface finish that promotes total internal reflection of the photons.

20. A method according to claim 14, in which the scintillation body is substantially elongate in shape, having a first end and a second end at opposite ends of the detection surface.

21. A method according to claim 20, in which the method comprises detecting the photons using a first photodetector positioned to detect photons at the first end and operable to generate a first output signal in response to photons detected and a second photodetector positioned to detect photons at the second end and operable to generate a second output signal in response to photons detected, and generating the output signal related to energy deposited in the scintillation body by the received gamma rays by summing the first output signal and the second output signal.

22. A method according to claim 14, in which the scintillation body is substantially disc-shaped, the detection surface being substantially circular.

23. A method according to claim 22, in which the scintillation body is provided with a coating of a diffusively reflecting material.

24. A method according to claim 22, in which a portion of the scintillation body comprises material that transmits photons but does not create photons from the received gamma rays, and the method comprises detecting the photons using a photodetector positioned adjacent the said portion and operable to generate the output signal.

* * * * *